United States Patent [19]
Reddy et al.

[11] Patent Number: 5,993,914
[45] Date of Patent: Nov. 30, 1999

[54] MEMORY DISC SUBSTRATE WITH DEFECT FREE SURFACE

[75] Inventors: K. Pattabhirami Reddy; Timothy A. Roe, both of Corning, N.Y.

[73] Assignee: Corning Incorporated, Corning, N.Y.

[21] Appl. No.: 09/126,997

[22] Filed: Jul. 31, 1998

Related U.S. Application Data

[60] Provisional application No. 60/054,414, Jul. 31, 1997.

[51] Int. Cl.[6] .............................. B05D 1/18; C03B 23/20
[52] U.S. Cl. .................. 427/443.2; 427/131; 427/430.1; 65/36; 65/45; 65/60.8
[58] Field of Search ................................ 427/108, 126.2, 427/430.1, 443.2, 193, 376.2; 65/45, 60.8, 36, 54, DIG. 11

[56] References Cited

U.S. PATENT DOCUMENTS

| | | | |
|---|---|---|---|
| 3,524,918 | 8/1970 | Goto | 13/6 |
| 3,862,830 | 1/1975 | Stern | 65/58 |
| 4,020,234 | 4/1977 | Gardner | 428/433 |
| 4,396,682 | 8/1983 | Mohri et al. | 428/428 |
| 4,690,846 | 9/1987 | Wada et al. | 428/64 |
| 4,738,885 | 4/1988 | Matsumoto | 428/64 |
| 4,808,455 | 2/1989 | Wada et al. | 428/64 |
| 4,808,463 | 2/1989 | Yoshikatsu et al. | 428/215 |
| 4,816,128 | 3/1989 | Wada et al. | 204/192.23 |
| 4,944,786 | 7/1990 | Oda et al. | 65/154 |
| 4,971,932 | 11/1990 | Alpha et al. | 501/3 |

*Primary Examiner*—Shrive Beck
*Assistant Examiner*—Jennifer Calcagni
*Attorney, Agent, or Firm*—Angela N. Nwaneri; Pat Pacella

[57] ABSTRACT

The present invention is directed to a defect-free magnetic memory disc substrate. In particular, it is directed to a composite alumina-based, glass-coated, article with a defect free surface. Several methods for its manufacture including frit bonding, molten glass submersion, and tape formation are disclosed.

8 Claims, 2 Drawing Sheets

MEMORY DISC SUBSTRATE WITH DEFECT FREE SURFACE

This application is a continuation of provisional application Ser. No. 60/054,414 filed Jul. 31, 1997.

BACKGROUND OF THE INVENTION

This invention relates generally to the field of magnetic memory disc substrates. In particular, it relates to composite ceramic and glass substrates which, for reasons to be described herein, produce superior substrates for magnetic memory disc products.

The pace of new developments in the computer industry is torrid. Disc recording capacity, for example, continues to increase geometrically, with apparently no end in sight. Higher capacity discs require defect-free, smooth surfaces to allow for error-free operation. Typically, today's high capacity discs spin at 5400 rpm during read/write operations. The next generation will likely spin at 8000 rpm. This means that the pick up head can see velocities of close to 80 mph. At these speeds, even small defects in the surface of the substrate will cause unacceptable errors.

Traditionally, magnetic memory discs have been fabricated of an aluminum metal or alloy substrate with the various magnetic and protective coatings deposited thereon.

This configuration suffers from several inadequacies: chief among these is a lack of stiffness. This problem is only exacerbated by the high speeds demanded of today's discs. In an effort to upgrade the disc substrate material, polycrystalline ceramic materials show great promise. Known for their stiffness and other superior mechanical properties, they lend themselves to this application.

Unfortunately, the potential of these materials remains unrealized. This is due in no small part to the inability of prior workers in the art to fabricate an essentially defect-free coating on the base ceramic substrate material which is both manufacturable and cost effective.

Among the relevant work in the field is:

U.S. Pat. No. 4,408,463 is drawn to a substrate for magnetic disks comprised of a polycrystalline ceramic material coated by a glaze layer;

U.S. Pat. No. 4,816,128 is drawn to a process for making a magnetic recording disk by coating an alumina-based ceramic with glass and then subjecting the coated article to a Hot Isostatic Pressure (HIP) step;

U.S. Pat. No. 4,738,885 is directed to a substrate for a magnetic disc comprising alumina which is HIPped and polished;

U.S. Pat. No. 4,971,932 teaches a magnetic memory storage substrate made of a glass ceramic;

U.S. Pat. No. 4,690,846 is directed to a substrate which comprises alumina coated by glass in a paste or powdered form;

U.S. Pat. No. 4,808,455 is directed to a substrate on which a glass layer is deposited and then subsequently polished;

JP 62-90451 is directed to a substrate of a crystalline material covered by a glass film; and JP 62-90445 is directed to a substrate of a crystalline material covered by a glass film.

Defects, in the form of pin holes and seeds, can not be tolerated in a high performance magnetic memory disc substrate. If present, they can wreak havoc on data transfer by causing the head to skip, decreasing the available real estate for recording, and causing problems in coating of the magnetic over layer.

Generally, pin holes and seeds are formed when materials are trapped in, or gas evolves from, the material deposited on the substrate. It is the very nature of the prior art processes which cause these defects. Additional defects to be avoided are inhomogenieties due to lack of mixing, and the like. Since the inventive methods use a molten or pre-melted glass, applicants have solved the problems encountered by the prior art.

OBJECT OF THE INVENTION

It is therefore an object of the invention to provide a magnetic memory disc substrate with a defect-free surface.

It is another aspect of the invention to provide several methods for making a magnetic memory disc substrate.

SUMMARY OF THE INVENTION

These, and other objects, can be achieved through the methods described herein. Specifically, applicants have developed novel methods for making a composite memory disc substrate comprising the steps of providing an alumina substrate and coating said alumina substrate with a defect free glass layer.

In one aspect, the invention relates to a method of making a composite memory disc comprising submerging an alumina substrate in molten glass.

In another aspect, the invention relates to a method of making a composite memory disc by bonding a sheet of glass to an alumina substrate.

In an additional aspect, the invention relates to a method of making a composite memory disc comprising:

forming a green alumina tape;

firing said tape; and applying a glass layer to the fired tape prior to cooling.

In yet another aspect, the invention relates to a laminated composite memory disk substrate comprising an alumina layer and a defect-free glass layer.

The foregoing drawings, which are incorporated in, and constitute part of the specification, illustrate various embodiments of the invention and together with the description, serve to explain the principles of the invention. It is to be understood that both the drawings and the description are explanatory only, and are not restrictive of the invention. The drawings are not intended to indicate scale or relative proportions of the elements shown therein.

DETAILED DESCRIPTION OF THE INVENTION

As mentioned previously, defects (pin holes and seeds in particular) are the bane of magnetic disc manufactures. Applicants have developed a number of methods for fabricating a composite magnetic memory disc which is essentially free of the defects encountered by other workers in this art. Most notable, however, is the fact that these methods are relatively inexpensive and repeatable, thus lending themselves to the type of mass manufacturing and price competitiveness required by the industry.

Figure 1:
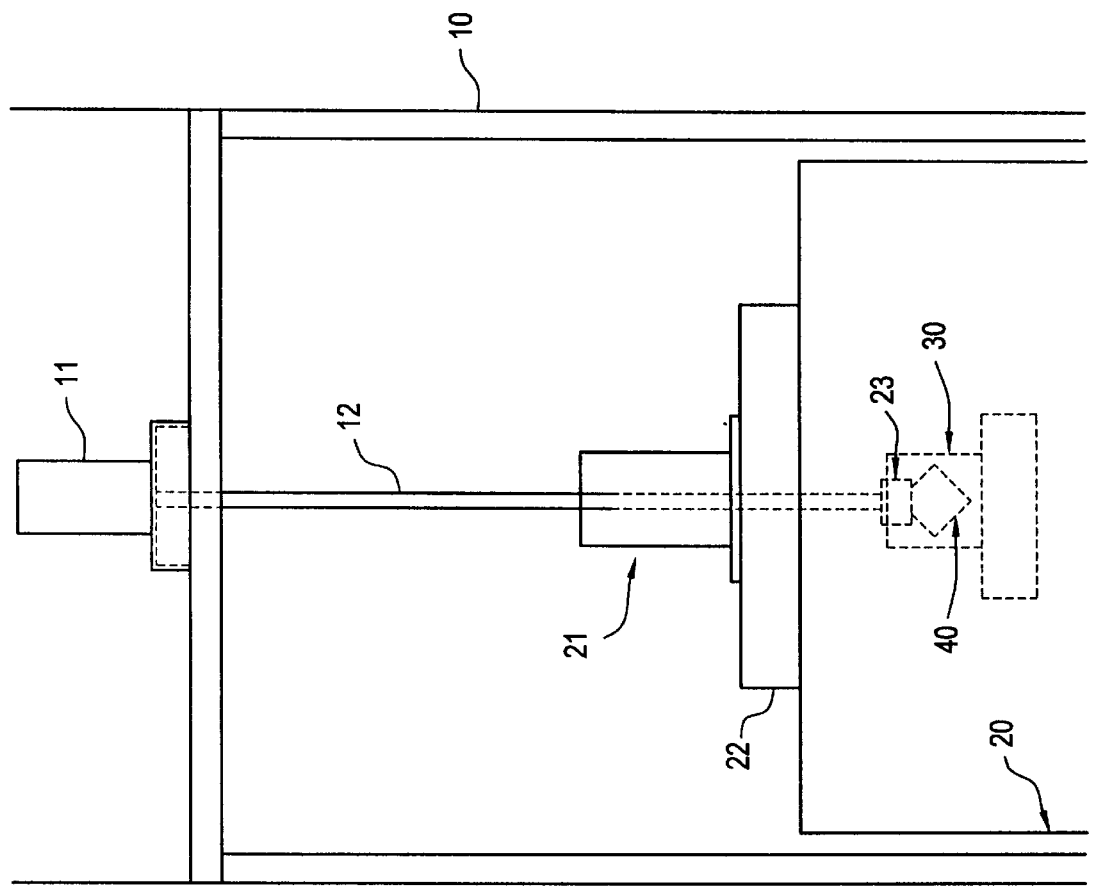
FIG. 1 is a block diagram of the dip coating apparatus of the present invention.
Figure 2:
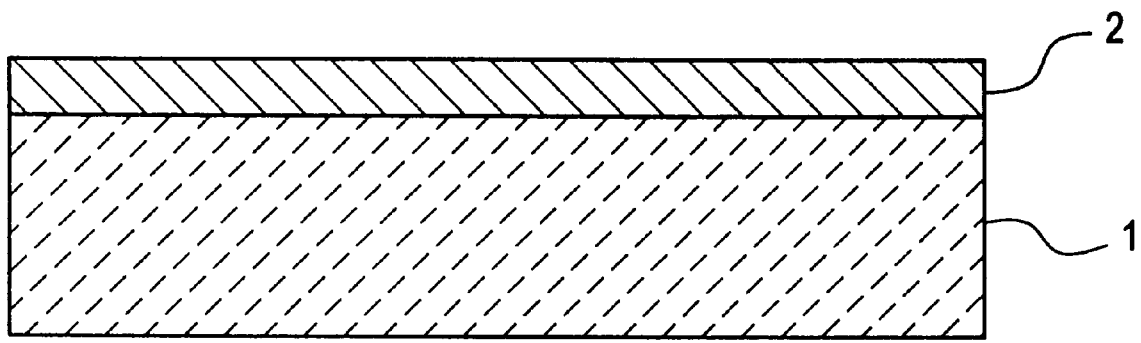
FIG. 2 is a cross-sectional view of the defect-free coated article of the present invention.

Each of the applicants' methods involves coating a polycrystalline substrate with glass. FIG. 1 shows a typical cross section of the composite article where an alumina substrate 1 is coated with a defect-free glass layer 2. A distinction is drawn between the glass used in the instant invention and the "glaze" used by some workers in the art. Although these terms are sometimes incorrectly used interchangeably, they have different meanings. In the context of this invention, we define glaze to be a material which is applied and must then be heated to fuse and flow. These materials may be deposited in powder form or suspended in a medium and applied via slipcasting, painting, screen printing or other conventional means. The glass coating of the instant invention, on the other hand, is a unitary glass sheet already fully reacted before or at the time it is applied.

Properties of the final composite are, to a large extent, dependent on the exact composition of the starting materials and the geometric configuration, e.g. aspect ratio, thickness, etc., of the final product. Suitable for the substrate material are high modulus materials such as alumina, silicon carbide, titanium diboride, silicon nitride, and aluminum nitride. Most preferred is alumina. Examples of suitable alumina are 96%–99% alumina from Kyocera or Coors Ceramic. This material typically has a Modulus of $50 \times 10^6$ psi and a fracture toughness of 4.0 Mpa/m$^2$. These substrates are inexpensive, costing as little as $0.05/in$^2$ in large quantities. Based on these properties, they provide an excellent mechanical support for glass coatings.

In another embodiment, a glass ceramic sheet may be added between the class layer and the polycrystalline layer.

The glass compositions may vary. Specific compositions used in the examples below were chosen because of their properties and availability and should be seen as illustrative only. For example, if a substrate with different mechanical properties than alumina, such as silicon nitride, were used, it is anticipated that the composition of the glass would change to accommodate the silicon nitride. In addition, it may be desirable to create or decrease stresses in the composite by manipulating the thermal expansion match/mismatch between the ceramic substrate and the glass coating. For example, selecting a glass composition with a lower thermal expansion than the substrate will result in residual compressive stress in the outer glass layers, thus strengthening the laminate.

EXAMPLE I

The first example is roughly described as the dipping/submerging of an alumina substrate in molten glass and raising it slowly to drain excess glass. A clean alumina substrate is first provided. Its physical properties are described in Table I.

TABLE I

Physical Properties of Alumina

| | |
|---|---|
| Density | 3.75 gm/cc |
| Flexural Strength | 58,000 psi |
| Elastic Modulus | 44 × 10$^6$ psi |
| Thermal Expansion Coefficient (25–500° C.) | 7.1 ppm/° C. |

The alkali free glass coating composition in Table II was selected because it has a similar thermal expansion (6.8 ppm/° C. from RT-300° C.) to alumina, and its viscosity at 1400° C. is relatively low (170 poises).

TABLE II

Glass Composition

| Batch Material | Weight % |
|---|---|
| SiO$_2$ | 53.5 |
| Al$_2$O$_3$ | 6.3 |
| CaO | 8.6 |
| SrO | 13.9 |
| BaO | 16.7 |
| As$_2$O$_3$ | 0.8 |

Reference is now made to FIG. 1 which is a block diagram of the apparatus for dip coating a substrate. This apparatus generally is comprised of a housing 10 and a furnace 20. With in the housing 10, is a prefurnace/cooling area 21, and a cover 22, located directly between the furnace and the prefurnace/cooling area. Cover 22 serves to maintain heat in the furnace while allowing for materials to be inserted and removed from the furnace.

Mounted to the housing 10 is motor 11. This motor is rotatably connected to a shaft 12. Said shaft having first and second terminal portions. Said first terminal portion being located generally in the vacinity of the motor 11 and said second terminal portion is located such that it may be inserted in to the furnace 20. The shaft 12 may be both rotated about its central axis and moved in a direction parallel to its central axis to take the second terminal portion into or out of the furnace 20. The rate at which the specimen is inserted to, and removed from, the crucible may be controlled via computer or some other controller (not shown) attached to the motor 11.

Mounted to the second terminal portion of shaft 12 is a specimen holder 23. It should be noted that any configuration that accomplishes the purpose of holding a specimen, and allowing for coating of the specimen, is contemplated by applicants and is within the scope of the invention. In addition, specimen holders for single or multiple specimens are also contemplated by applicants.

The furnace 20 is generally of the batch type known in the art. It is constructed of structural members (not shown), refractory brick (not shown), and heating elements (not shown). Within the furnace 20 is located a crucible 30, typically made of platinum or other refractory, non-reactive material.

In operation, a specimen 40 to be coated is mounted to the specimen holder 23. Motor 11, or some other means, inserts the specimen holder into the prefurnace/cooling area 21 which is generally at a temperature of 800–900° C. Here the specimen is pre-heated so that it is not subjected to a thermal shock upon entry into the furnace 20. After preheating, the specimen holder is inserted into the furnace. The specimen is then lowered at a controlled rate into the crucible 30 containing molten glass of the composition to be coated on the specimen. In this example, an alumina substrate was lowered into a platinum crucible at the rate of 0.72 inches/min. Other rates may be used, depending on the geometry of the setup.

After the alumina was fully submerged in the molten glass, it was held steady for two minutes to allow for thermal equilibrium to be established. The furnace temperature was at approximately 1400° C. Since viscosity is the most important property at this point, the furnace temperature will largely depend on the glass composition. After two minutes, the specimen was raised at a rate of 0.14 inches/min. from the glass melt. The speed must be carefully controlled.

Withdrawing at a rate too fast will result in a coating which is too thick. Generally, a speed of up to 0.5 in/min. will yield acceptable results. Once the specimen is completely removed from the glass, the speed was increased to 2.5 inches/min. to raise it to the prefurnace/cooling area 21. Once the specimen was raised to the area 21, the power to the furnace was turned off, and the apparatus was allowed to cool to room temperature.

Table 3 gives the values of average glass coating thickness obtained at various dip temperatures.

TABLE III

Glass Coating Thickness at Different Dip Temperatures

| Temperature (° C.) | Viscosity (poises) | Average Coating Thickness per side (microns) |
| --- | --- | --- |
| 1400 | 170 | 125 |
| 1350 | 310 | 140 |
| 1320 | 450 | 160 |
| 1275 | 875 | 210 |

For this example, the alumina substrate was coated on both sides—it is also possible to mask one side of the substrate in order to provide a coating on one side only.

EXAMPLE II

In this example, a magnetic memory disc is made by bonding a thin sheet of glass to an alumina substrate. First, a thin 0.002"–0.010" glass sheet is provided. This sheet may be made by the slit draw process, or any other method which yields a uniform thin sheet. The glass should be of a composition to have a softening temperature greater than the firing temperature of the bonding frit. Preferably, the softening temperature should be at least 100° C. above the firing temperature of the frit. Corning's 7059 glass (used in Example 1) is suitable.

Next, an alumina substrate like that used in Example 1 is provided. The same considerations discussed above apply here as well. The alumina substrate is then coated with the frit. The frit should be selected on the basis of thermal expansion, softening point, and bonding characteristics. After this, the thin glass sheet is placed on top of the frit.

The assembly is then heated to melt the frit and bond the glass to the alumina substrate. This method has the significant advantage of a generally low capital cost. Additionally, this method possesses the tremendous advantage of being able to compensate for camber in the surface of the substrate, thus eliminating any polishing/grinding of the substrate. The frit will flow selectively in to low spots in the substrate, and thus provide a flat surface for bonding to the glass. This, in turn, allows the top surface of the glass to be as flat as possible. Optionally, pressure may be applied up to 300 psi to facilitate flow and bonding.

EXAMPLE III

This example involves a continuous sheet forming process. Processes for the manufacture of alumina tape are well known. For example, doctor blading or roll compaction is used to form sheets of green (unfired) ceramic. The sheets may be then fired as is to form substrates, metallized prior to firing, or laminated together as is done to provide for semiconductor packaging. Generally, the alumina can be either manipulated on in the green state then fired or fired and then machined.

Applicants, however, seek to use the alumina after it is fired, but prior to its cool down. In this method, alumina tape is sintered in the normal fashion, but not allowed to cool as usual. Instead, liquid glass, or softened sheet glass, may be applied to the alumina as it exits the hot portion of the furnace. In this way, a continuous process is developed which is both energy sensitive (only one furnace is used for both materials) and easy on the materials since there is no additional heating step.

Specific mechanical properties of the final composite may be tailored to a certain extent by the exact composition of the glass, alumina base layer, and the ratio of the thickness of each to the other.

Having thus described the basic concept of the invention, it will be readily apparent to those skilled in the art that the foregoing detailed disclosure is intended to be presented by way of example only, and applicants' do not mean to limit their invention thereto. Various alterations, improvements, and modifications will occur, and are intended to those skilled in the art, though not expressly stated herein. These modifications, alterations, and improvements are intended to be suggested hereby, and are within the spirit and scope of the invention. Accordingly, the invention is limited only by the following claims and equivalents thereto.

We claim:

1. A method for making a composite memory disc substrate comprising the steps of:

(a) providing polycrystalline ceramic substrate; and
   (b) coating said substrate with a defect free glass layer by inserting said substrate in a pre-heating chamber to raise it to a first temperature;
   moving said substrate into a furnace heated to a second temperature which contains molten glass;
   submerging said substrate in said molten glass such that the substrate becomes coated with the molten glass;
   withdrawing the coated substrate from the molten glass;
   holding the coated substrate in the pre-heating chamber at the first temperature; and
   allowing the substrate to cool to room temperature.

2. The method of claim 1 where said substrate is alumina.

3. The method of claim 1 wherein said substrate is submerged in said molten glass for a period of time sufficient to reach thermal equilibrium.

4. The method of claim 1 wherein the coated substrate is removed from the molten glass at a controlled rate.

5. The method of claim 1 wherein the substrate is cooled to room temperature by shutting the power off to the furnace.

6. The method of claim 1 further comprising adding a glass ceramic sheet between the glass and polycrystalline layers.

7. A method of making a composite memory disc comprising:

forming a green alumina tape;
   firing said tape; and
   applying a glass layer to the fired tape immediately subsequent to its firing and prior to its cooling.

8. The method of claim 7 wherein said tape is fully sintered prior to applying the glass layer.

* * * * *